(12) United States Patent
Manduzio et al.

(10) Patent No.: US 9,296,134 B2
(45) Date of Patent: Mar. 29, 2016

(54) METHOD FOR PRODUCING A HEAD RESTRAINT AND HEAD RESTRAINT

(75) Inventors: Felix Manduzio, Strasbourg (FR); Nathalie Lang, Wisches (FR); Daniel Navarro, Haguenau (FR)

(73) Assignee: Johnson Controls Technology Company, Holland, MI (US)

( * ) Notice: Subject to any disclaimer, the term of this patent is extended or adjusted under 35 U.S.C. 154(b) by 379 days.

(21) Appl. No.: 13/700,262

(22) PCT Filed: Jan. 25, 2011

(86) PCT No.: PCT/EP2011/000296
§ 371 (c)(1),
(2), (4) Date: Apr. 24, 2013

(87) PCT Pub. No.: WO2011/150989
PCT Pub. Date: Dec. 8, 2011

(65) Prior Publication Data
US 2013/0207435 A1    Aug. 15, 2013

(30) Foreign Application Priority Data

May 31, 2010    (DE) .......................... 10 2010 022 046

(51) Int. Cl.
| | |
|---|---|
| *B29C 44/14* | (2006.01) |
| *B29C 44/12* | (2006.01) |
| *B60N 2/48* | (2006.01) |
| *B60N 2/70* | (2006.01) |

(52) U.S. Cl.
CPC ................ *B29C 44/14* (2013.01); *B29C 44/12* (2013.01); *B60N 2/48* (2013.01); *B60N 2/7017* (2013.01)

(58) Field of Classification Search
CPC  B29K 2105/04; B29C 44/12; B29C 44/1271; B29C 44/14; B60N 2/48; B60N 2/7017
USPC ............... 297/DIG. 1, DIG. 2; 264/46.6, 46.4
See application file for complete search history.

(56) References Cited

U.S. PATENT DOCUMENTS 2,727,278 A * 12/1955 Thompson .................... 264/46.4
3,204,016 A *  8/1965 Sanger et al. ................. 264/46.7
(Continued)

FOREIGN PATENT DOCUMENTS

| | | |
|---|---|---|
| DE | 10238597 A1 | 3/2004 |
| FR | 1320410 A | 3/1963 |

(Continued)

OTHER PUBLICATIONS

International Search Report & Written Opinion for application No. PCT/EP2011/000296 mailed Sep. 30, 2011.
(Continued)

*Primary Examiner* — Milton Nelson, Jr.
(74) *Attorney, Agent, or Firm* — Fletcher Yoder, P.C.

(57) ABSTRACT

The invention relates to a method for producing a head restraint, in particular a motor vehicle head restraint, wherein the head restraint has a cover and a foam material, wherein the foam material fills out the cover at least in some areas, wherein the method comprises the following steps: producing a prototype mold, wherein the prototype mold comprises at least two parts, wherein when the parts of the prototype mold are assembled, the prototype mold has an inner surface that faces the interior of the prototype mold and an outer surface, producing the cover, assembling the parts of the prototype mold in such a way that the cover is arranged in the interior of the prototype mold, and introducing the foam material into the interior of the cover, wherein the foam material is at least partially liquid when said foam material is introduced into the interior of the cover.

3 Claims, 4 Drawing Sheets

(56) References Cited

U.S. PATENT DOCUMENTS

| | | | |
|---|---|---|---|
| 4,042,663 A | * | 8/1977 | Harder, Jr. .................... 264/45.7 |
| 4,119,583 A | * | 10/1978 | Filip et al. ..................... 521/103 |
| 5,261,726 A | * | 11/1993 | Yanagishita .................. 297/408 |
| 2004/0000738 A1 | | 1/2004 | Tanaka |

FOREIGN PATENT DOCUMENTS

| | | |
|---|---|---|
| JP | 2001500396 | 1/2001 |
| JP | 2002187142 | 2/2002 |
| WO | 2006103242 | 10/2006 |

OTHER PUBLICATIONS

Japanese Office Action dated Jan. 14, 2014.

"The Production of Electroforming Moulds Based on Laser Rapid Prototyping." from the Compilation of Dissertations from the 4th National Conference on Laser Processing—1997, pp. 1-9.

* cited by examiner

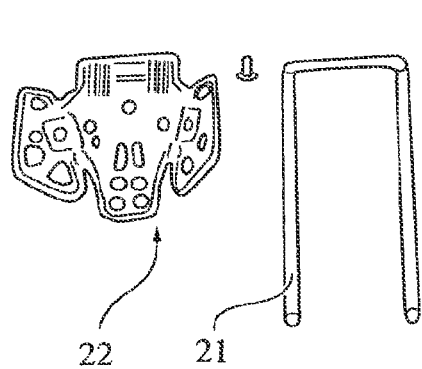
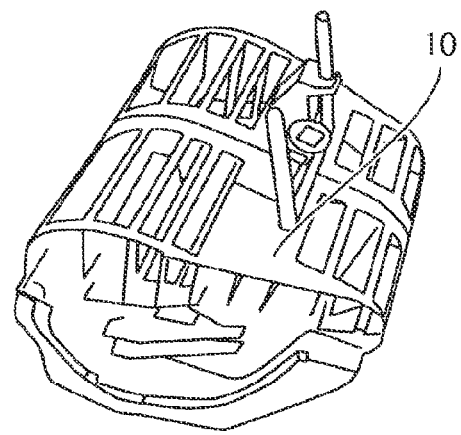
Fig. 2    Fig. 3
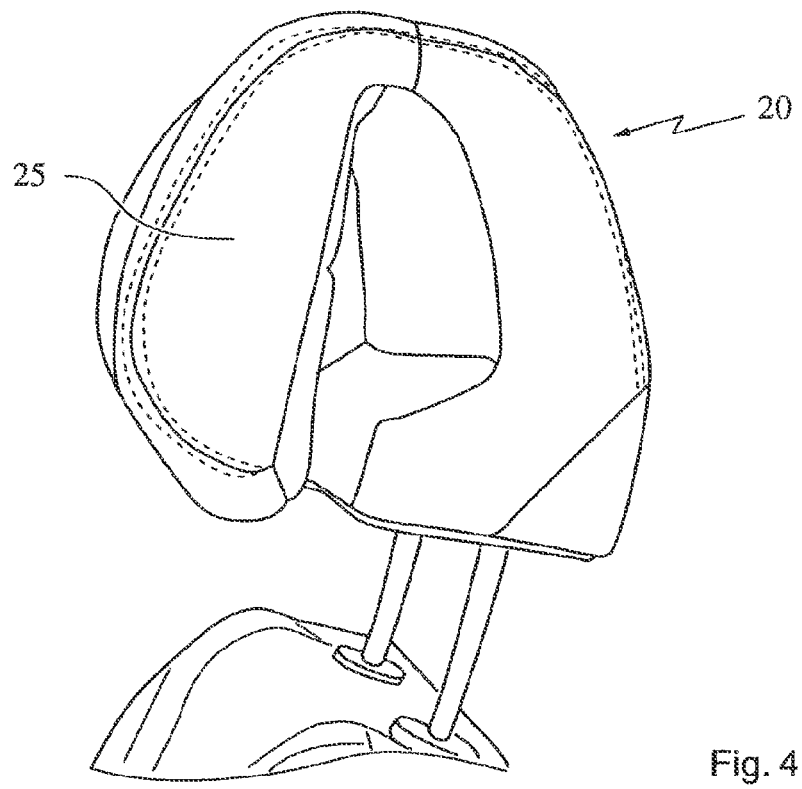
Fig. 4

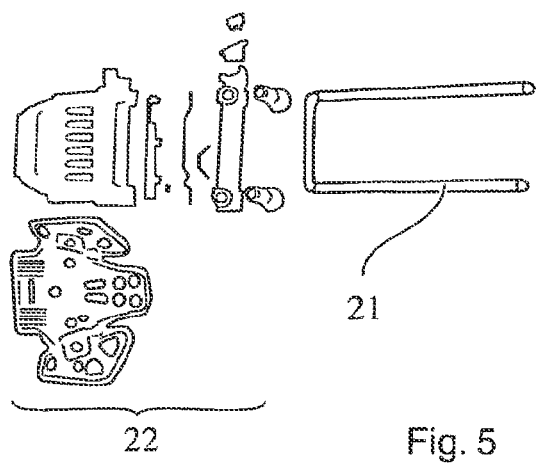
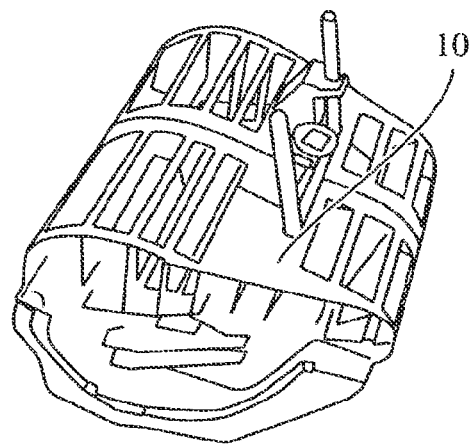
Fig. 5
Fig. 6
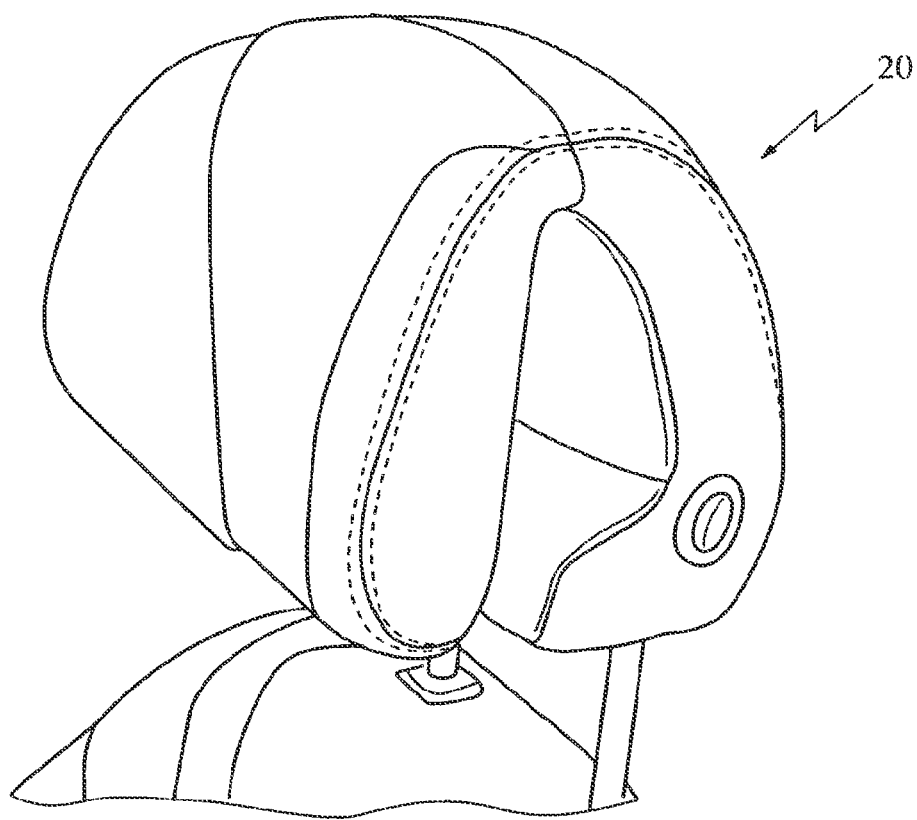
Fig. 7

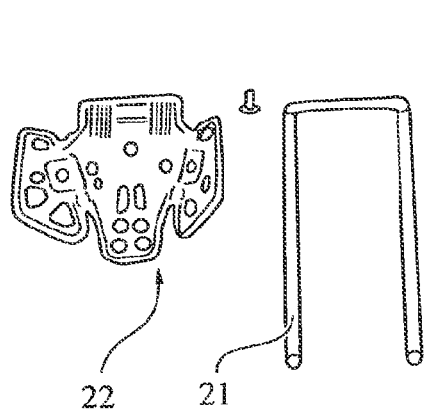
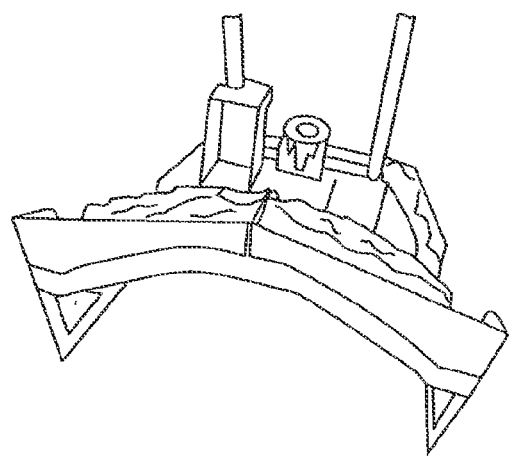
Fig. 8          Fig. 9
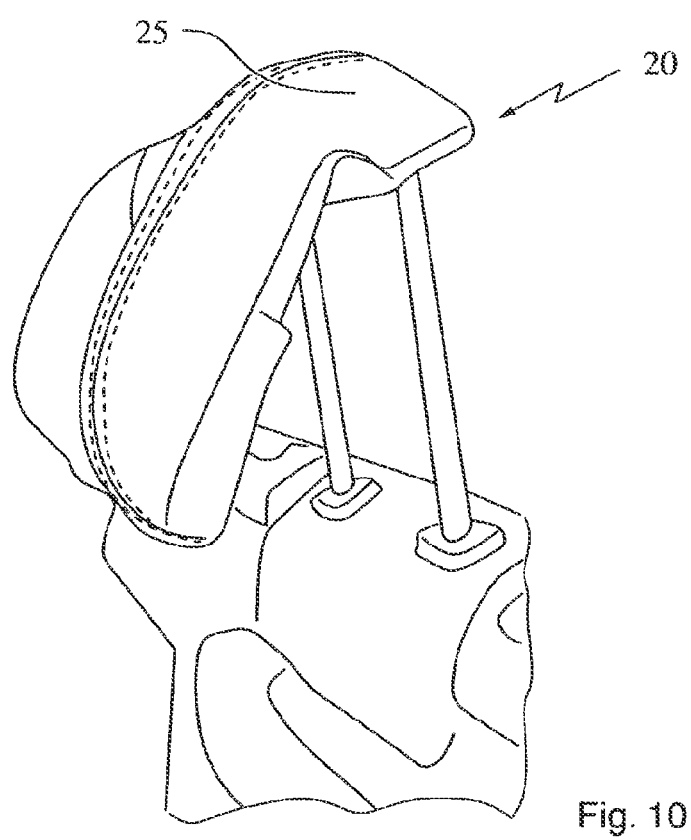
Fig. 10

METHOD FOR PRODUCING A HEAD RESTRAINT AND HEAD RESTRAINT

CROSS REFERENCE TO RELATED APPLICATIONS

This application claims priority from and the benefit of PCT Application No. PCT/EP2011/000296, filed on Jan. 25, 2011; and German Patent DE 10 2010 022 046.9, filed on May 31, 2010; both entitled "Method for Producing a Head Restraint and Head Restraint", which are herein incorporated by reference.

BACKGROUND

The present invention relates to a method for producing a head restraint, in particular a motor vehicle head restraint, wherein the head restraint has a lining and a foam material, wherein the foam material fills out the lining at least in regions The present invention also relates to a head restraint, in particular a motor vehicle head restraint, wherein the head restraint has a lining and a foam material, wherein the foam material fills out the lining at least in regions.

Methods for producing head restraints are known in which the introduction of the foam material into the lining of the head restraint takes place when the foam material is at least partially in the liquid state, referred to as the "pour in place" technique, that is to say the foam material is provided as foam material which is poured in on site, or the lining is provided with the foam introduced into it.

SUMMARY

It is an object of the present invention to provide a method for producing a head restraint, in particular a motor vehicle head restraint, wherein particularly little outlay (and therefore also a particularly short amount of time) is required to be able to produce a first prototype of the head restraint such that the prototype of the head restraint is either exactly identical to a head restraint which would have been produced, using the same design, by means of molds for the mass production of head restraints.

The object is achieved by means of a method for producing a head restraint, in particular a motor vehicle head restraint, wherein the head restraint has a lining and a foam material, wherein the foam material fills out the lining at least in regions, wherein the method has the following steps:
producing a prototype mold, wherein the prototype mold comprises at least two parts, wherein the prototype mold, in the assembled state of its parts, has an inner surface pointing into the interior of the prototype mold and has an outer surface,
producing the lining,
assembling the parts of the prototype mold in such a way that the lining is arranged in the interior of the prototype mold,
introducing the foam material into the interior of the lining, wherein the foam material is at least partially liquid at the time at which it is introduced.

In this way, according to the invention, it is particularly advantageously possible for a rapid prototyping process (process for the fast production of a prototype) for forming to be able to be used to produce the prototype mold.

In particular, according to the invention, in one particularly advantageous embodiment, it is possible for the prototype mold to be produced by means of a stereolithography process.

Through the use of a stereolithography process, it is possible, without very high cost outlay, for the prototype mold to be produced particularly quickly and nevertheless inexpensively.

According to the invention, in a further preferred embodiment, it is provided that, during the production of the prototype mold, reinforcement ribs are formed in the region of the outer surface thereof.

Through the direct realization of reinforcement ribs on the outer surface of the prototype mold, it is advantageously possible for dimensional changes of the prototype mold and thus also of the head restraint produced in the prototype mold during the introduction of the foam material to be entirely or at least substantially prevented, such that as a result of the definition of the inner surface and of the outer surface of the prototype mold, the finished shape of the head restraint produced in the prototype mold can be determined particularly precisely.

According to the invention, it is also particularly preferable if, during the production of the prototype mold, connecting elements for connecting the individual parts of the prototype mold are produced from the material of the prototype mold.

In this way, it is possible in a particularly advantageous manner for the prototype mold to be assembled in a particularly simple manner.

Furthermore, it is also preferably provided according to the invention that, during the production of the prototype mold, recesses are produced in the prototype mold, wherein the recesses serve for the fastening of connecting elements which are provided for connecting the individual parts of the prototype mold.

In this way, it is particularly advantageously possible according to the invention in this embodiment for the assembly of the prototype mold to be effected for example by means of the same connecting elements.

A further subject matter of the present invention relates to a head restraint, in particular motor vehicle head restraint, wherein the head restraint has a lining and a foam material, wherein the foam material fills out the lining at least in regions, wherein the head restraint is produced in such a way that the foam material is at least partially liquid at the time at which the foam material is introduced into the lining, wherein the head restraint is provided in such a way that the lining is arranged in the interior of a prototype mold before the foam material is introduced into the interior of the lining.

DRAWINGS

Exemplary embodiments of the invention are illustrated in the drawing and will be explained in more detail in the following description of the figures.

FIG. 2 shows a plurality of structural elements of the head restraint as per a first embodiment, which structural elements are arranged at least partially in the interior of the lining of the head restraint in the fully assembled head restraint according to the invention.

FIG. 3 shows a prototype mold for producing a head restraint according to the invention in the assembled state, wherein the structural elements of the head restraint are situated at least partially in the interior of the lining of the head restraint.

FIG. 4 shows the vehicle head restraint as per the first embodiment in a position of use, that is to say mounted in the region of the top end of the backrest of a vehicle seat.

FIG. 5 shows a plurality of structural elements of the head restraint as per a second embodiment of the head restraint according to the invention.

FIG. 6 shows a prototype mold for producing a head restraint according to the invention as per the second embodiment in the assembled state, wherein the structural elements of the head restraint are situated at least partially in the interior of the lining of the head restraint.

FIG. 7 shows the vehicle head restraint as per the second embodiment of the present invention in a position of use, that is to say mounted in the region of the top end of the backrest of a vehicle seat.

FIGS. 8, 9 and 10 show a third embodiment of the head restraint according to the invention, wherein FIG. 8 shows structural elements, FIG. 9 shows the prototype mold and FIG. 10 shows the fully assembled head restraint.

DETAILED DESCRIPTION

Figure 1:
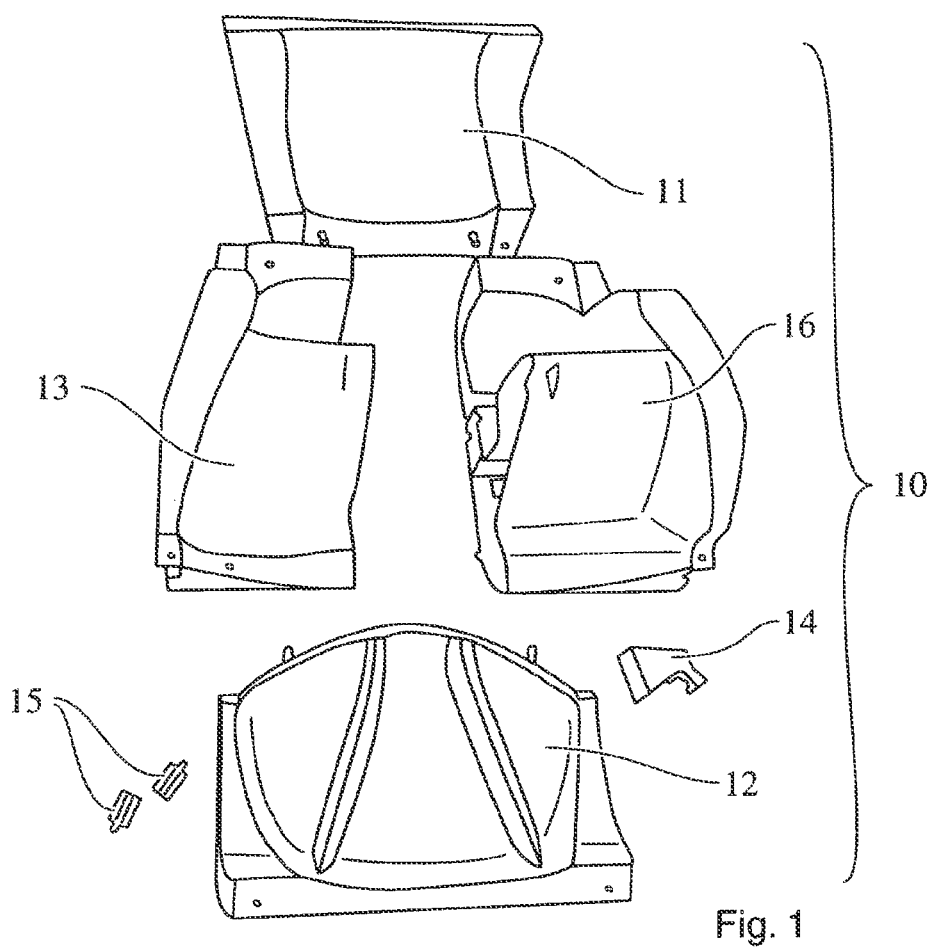
FIG. 1 shows the individual parts or the parts of a prototype mold for use in a method according to the present invention for producing a head restraint.

FIG. 1 schematically shows a prototype mold 10 as per a first embodiment, which is provided for use in the production method according to the invention. The prototype mold 10 as per the first embodiment comprises a multiplicity of different parts or individual parts 11, 12, 13, 14, 15. Here, in the first embodiment, it is for example provided that the prototype mold comprises a first part 11, a second part 12, a third part 13, a fourth part 14, a plurality of fifth parts 15 and a sixth part 16.

The fourth part 14 and the fifth parts 15 (which are produced from the material of the prototype mold) are for example provided for serving as connecting elements 14, 15, that is to say in the assembled state, the prototype mold is at least partially held together by the mounting of the connecting elements 14, 15.

As an alternative to this, however, it may also be provided that the fourth part 14 and the fifth part 15 do not serve as connecting elements, but rather further connecting elements (not illustrated) which are not produced from the material of the prototype mold serve for holding the prototype mold together.

FIG. 2 illustrates a plurality of structural elements 21, 22 of the head restraint 20 according to the invention (cf. FIG. 4) as per the first embodiment. A first structural element 21 is formed for example as a head restraint rod. A second structural element 22 is formed for example as a holding plate of the head restraint 20 as per the first embodiment. The structural elements 21, 22 are arranged at least partially in the interior of the lining 25 (see FIG. 4) of the head restraint 20 in the fully assembled head restraint 20 according to the invention.

FIG. 3 illustrates a prototype mold 10 for producing a head restraint 20 according to the invention as per the first embodiment in the assembled state, wherein the structural elements 21, 22 of the head restraint 20 are already situated in the interior of the lining 25 of the head restraint 20.

FIG. 4 illustrates the vehicle head restraint 20 as per the first embodiment in a position of use, that is to say mounted in the region of the top end of the backrest of a vehicle seat. FIG. 4 also schematically shows the lining of the head restraint.

FIGS. 5, 6 and 7 show a second embodiment of the head restraint 20 according to the invention, wherein FIG. 5 again shows a plurality of structural elements 21, 22 of the head restraint 20 as per a second embodiment, wherein FIG. 6 shows the prototype mold 10 for producing the head restraint 20 according to the invention as per the first embodiment in the assembled state, and wherein FIG. 7 illustrates the complete head restraint 20.

FIGS. 8, 9 and 10 show a third embodiment of the head restraint according to the invention, wherein FIG. 8 shows structural elements 21, 22, FIG. 9 shows the prototype mold 10 for producing the head restraint 20, and FIG. 10 shows the fully assembled head restraint 20.

To produce a head restraint according to the invention, that is to say in particular a prototype of a head restraint which is subsequently to be mass produced by means of a mass production mold, a lining is produced in accordance with a head restraint design, and the parts 11, 12, 13, 14, 15, 16 of the prototype mold 10 are produced by means of a rapid prototyping process.

The prototype mold 10 defines, in its interior, an inner surface into which the lining 25 is placed. The prototype mold is subsequently joined together.

In a subsequent step, a foam material (not illustrated in the drawings) as filler material of the head restraint lining 25 is introduced, in an at least partially liquid state, into the interior of the lining 25 and thus also into the interior of the prototype mold 10. The at least partially liquid foam material solidifies and expands. This method is referred to as the so-called "pour in place" technique and has the advantage that the connection between the foam material and the lining can be produced more easily, because it is not necessary for a lining to be pulled over an already fully produced foam body.

The invention claimed is:

1. A method for producing a head restraint for a motor vehicle, wherein the head restraint has a lining and a foam material, wherein the foam material fills out the lining at least in regions, wherein the method has the following steps:
   producing a prototype mold, wherein the prototype mold comprises at least two mold parts, wherein the prototype mold, in an assembled state of the mold parts, has an inner surface pointing into the interior of the prototype mold and has an outer surface, the prototype mold is produced by a stereolithography process, a plurality of reinforcement ribs are formed on the outer surface of the prototype mold during the production of the prototype mold, the plurality of reinforcement ribs extends in a plurality of different directions, the plurality of reinforcement ribs are configured to reduce dimensional changes of the prototype mold and of the head restraint produced in the prototype mold during introduction of the foam material, and the shape of the head restraint produced in the prototype mold is determined by the inner surface and the outer surface of the prototype mold;
   producing the lining;
   assembling the mold parts of the prototype mold in such a way that the lining is arranged in the interior of the prototype mold;
   introducing the foam material into the interior of the lining, wherein the foam material is at least partially liquid at the time at which it is introduced.

2. The method as claimed in claim 1, wherein during the production of the prototype mold, connecting elements for connecting the mold parts are produced from the material of the prototype mold.

3. The method as claimed in claim 1, wherein during production of the prototype mold, recesses are produced in the prototype mold, wherein the recesses are configured to fasten connecting elements, which are provided for connecting the mold parts.

* * * * *